Dec. 4, 1956
U. E. BOWES
2,772,517
FEEDER FOR SHEETS OF GLASS AND SIMILAR
THERMOPLASTIC MATERIALS
Filed Oct. 9, 1952
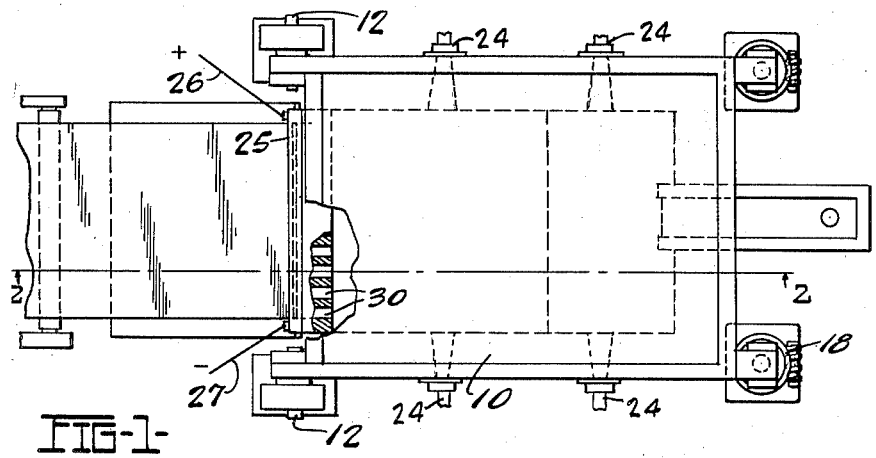
FIG-1-
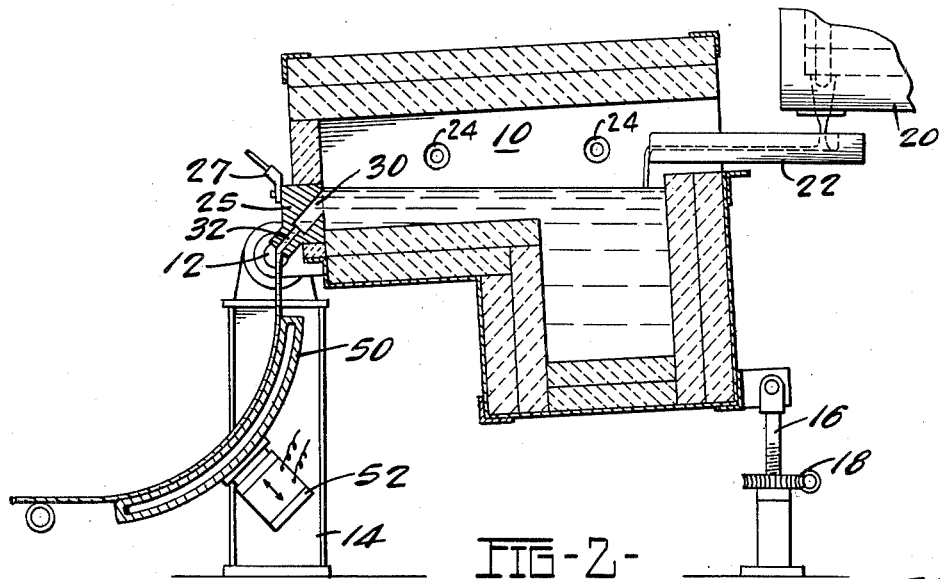
FIG-2-
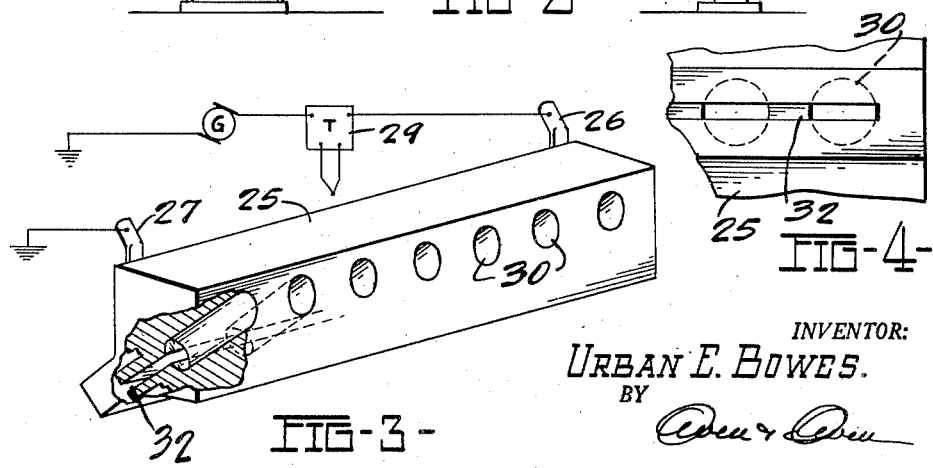
FIG-3-
FIG-4-
INVENTOR:
URBAN E. BOWES.
BY
ATTYS.

United States Patent Office 2,772,517
Patented Dec. 4, 1956

2,772,517

FEEDER FOR SHEETS OF GLASS AND SIMILAR THERMOPLASTIC MATERIALS

Urban E. Bowes, Perrysburg, Ohio

Application October 9, 1952, Serial No. 313,957

4 Claims. (Cl. 49—17)

This invention relates to an apparatus for feeding glass and similar thermoplastic material in the form of sheets of substantial width.

It has heretofore been proposed to form sheets of glass by drawing continuously from an elongated rectangular orifice, with the expectation that the surface finish of the glass and its uniformity of thickness would be so perfect that little or no grinding and polishing would be required to produce an optically satisfactory sheet. Such proposals have been only partially successful for the reason that the natural rate of flow of the glass being greatly influenced by temperature and viscosity variations is difficult to correlate with the rate of operation of the associated glass moving means and the amount of glass still removed in grinding and polishing constitutes a great economic waste. In the case of glass flowed through an elongated orifice between rolls, too rapid operation of the rolls with respect to the natural rate of flow of the glass causes the sheet to be narrowed in width, or thinned irregularly in cross section. Slow operation of the rolls causes the glass either to widen out beyond its intended width or to accumulate at the entrance to the space between the pulling rolls with the result that uneven flow occurs through the cross section of the glass and the resulting sheet is wavy and imperfect. Various expedients have been suggested to overcome these difficulties. In every instance with which I am familiar, however, such expedients have been unsuccessful, and it is still the commercial practice to grind and polish a considerable layer from each side of the sheet to obtain the desired perfection.

It has been found difficult to maintain an equal flow of glass across the entire length of an elongated orifice for the reason that the rate of flow is dependent on a plurality of factors, such as the configuration (spacing) of the walls of the orifice, the viscosity of the supply, the temperature of the walls of the slot through which the glass flows, the relationship of this temperature to the temperature of the supply, and any thermal deformation of the walls of the slot.

The patent literature contains disclosures of attempts that have been made to flow glass between metal orifice-forming sheets and platens and over refractory dams. The greatest difficulty that has prevented the use of metallic orifices for the formation of glass sheets has been the lack of rigidity inherent in a long relatively thin metal member which must have unsupported surfaces forming the slot or orifice. In the case of refractory dams, the dimensional characteristics are impossible to maintain because the refractory material is eroded by and dissolved in the flowing glass.

The present invention has for its primary object to provide a feeder having a metallic slot-like orifice for the formation of a glass sheet that can be made as long as desired without likelihood that thermal deformation will change the dimensions of a sheet formed by flowing glass through it.

In my Patent No. 2,539,398 I have disclosed a means to form a glass sheet of uniform thickness by the cooperative action of vibrated glass receiving and shaping platens. In the disclosure of that patent the glass is fed to the platens either by pulling from a tank or by gravity. Another object of the present invention is to provide an improved feeder whereby a high degree of uniformity of both width and cross section can be readily maintained, and reliance upon the vibrating action of the platens reduced. In the case of the present invention the vibrating platen, if used, must be relied on only to change the direction of flow of the glass sheet issuing from the slot-like orifice.

Briefly stated the present invention comprises the provision of a metallic feeder body having a multiplicity of glass receiving channels having their entrance ends associated with a common supply and each feeding, in parallel, a common rectangular discharge orifice. The receiving channels and discharge orifice may conveniently be formed in a single massive wide member capable of excellent dimensional stability and of being easily maintained at uniform temperature. The channels are constantly flooded by or immersed in molten glass and the sheet which issues therefrom has uniform edges and planar surfaces that require less than usual grinding and polishing.

A preferred embodiment of the invention is shown in the accompanying drawings in which:

Fig. 1 is a plan view of a feeder embodying the present invention;

Fig. 2 is a section on the line 2—2 of Fig. 1;

Fig. 3 is a perspective view with parts broken away of the orifice plate or feeder body, a heating means being indicated diagrammatically; and Fig. 4 is a fragmentary outer end view of the feeder body.

Referring to the drawings, the feeder of the present invention is shown in association with a diagrammatically indicated receptacle 10 for molten glass or like material. The receptacle is preferably mounted for tilting movements about a pair of trunnions 12 carried on stands 14, tilting being accomplished by any suitable mechanism such as jack screws 16 rotated by common worm and wheel drives 18. By this means the level of molten material in the receptacle 10 may be maintained at any desired point to establish the desired head or flowing pressure. Preferably the level is sufficient to immerse completely the feeder inlet openings hereinafter described.

Molten material may be supplied to the receptacle 10 in any suitable manner from a furnace or tank 20 through a trough 22. Provision may be made for heating the receptacle 10 to maintain the glass flowing through it at the most effective temperature for proper sheet formation. Conventional gas burners 24 are shown in the drawings for this purpose.

The feeder comprises a massive metallic body 25 forming the lower front wall portion of the receptacle 10 and supported throughout its entire length by the refractory front wall and sealed therein. The body 25 is preferably capable of conducting electricity with enough resistance that the passage of current therethrough will permit the temperature of the feeder body to be adjustable to increase or decrease the viscosity of material fed thereby. Certain known nickel-chromium alloys serve admirably for the purpose. The alloys are capable of conducting electricity with the proper resistance and are thus capable of being electrically heated to the desired temperature within very close limits. The alloys resist the erosion of glass flowing through the feeder body and are insoluble in molten glass. Electrical connections are indicated at 26 and 27 and, as shown in Fig. 3, the electrical circuit may be conveniently controlled by a thermostat 29 to maintain a predetermined body temperature and thus regulate the viscosity of the material passing through the feeder.

The body 25 is provided with a series of spaced inlet openings 30 which extend inwardly and downwardly with respect to the interior face of the body. The inlet openings 30 are preferably uniformly spaced across the length of the body, although non-uniform spacing may be used if temperature gradients exist at the inlet face of the body. For ease of forming, the inlet openings are made cylindrical, and each of the openings is carried to the same depth.

A single discharge opening is formed in the body 25 and intersects all of the inlet openings. The discharge opening is an elongated rectangular slot 32, narrower in width than the diameter of the inlet openings, and of a length such that its end walls fall just within the periphery of the outermost inlet openings. In the preferred form the center plane of the slot is symmetrically placed with respect to the common diametral plane of the inlet openings. The flow capacity of the single discharge opening 32 is such that the plurality of inlet openings maintain the slot constantly full of molten material which is thus in contact with the top and sides of the discharge opening as well as the bottom wall thereof. The slot 32 terminates, of course, at the lower and outer side of the massive feeder body. The lip or slot opening lies very close to the supporting refractory so that there is little tendency for the material defining the lower wall of the slot to bend downwardly even though it is heated to a relatively high temperature.

Material issuing from the discharge slot 32 is in the form of a flat sheet having clearly defined and uniform side edges and also having a definite thickness. The material emerging, if it is glass, may be quite viscous but still capable of being guided into a different directional plane by, for example, a curved platen 50 to which a vibratory motion is imparted by a magnetic vibrator 52 in a known manner. After leaving the curved platen the sheet is self supporting and may be conveyed directly to grinding and polishing apparatus. Much less grinding and polishing are required in the case of sheets formed by the feeder of the present invention than is usually required to finish sheets drawn in known processes, since less material must be removed to result in a plane smooth surface.

While the invention has been disclosed in conjunction with a feeder of a particular configuration it should be understood that various modifications and changes may be made without departing from the spirit of the appended claims.

What is claimed is:

1. A feeder for sheet glass or the like comprising a container for molten glass, a metal alloy body member in an outer wall of said container, a plurality of laterally spaced individual openings formed in said member, said openings extending inwardly and downwardly from the inner face thereof and partially through said member, a laterally extending continuous rectangular discharge opening extending inwardly from the outer face of said member intersecting within said body member the lower ends of all of said individual openings, means for regulating the static pressure head of molten glass over said openings, by changing the height of the glass over said openings, to thereby control the flow of glass through said individual openings to said laterally extending discharge opening, said latter discharge opening having the dimensions of the finally formed sheet, and means to heat said body member to maintain therein a predetermined temperature.

2. A feeder for sheet glass or the like comprising a container for molten glass, a metal alloy body member forming an outer wall of said container, a plurality of laterally spaced individual openings formed in said member, said openings extending inwardly and downwardly from the inner face thereof and partially through said body member, a laterally extending continuous rectangular discharge opening extending inwardly from the outer face of said body member and intersecting within said body member the lower ends of all of said individual openings, means for regulating the static pressure head of molten glass over said openings, by changing the height of the glass over said openings, to thereby maintain the aggregate volume of flow of glass to said laterally extending discharge opening, said latter discharge opening having the dimensions of the finally formed sheet, and means to control the viscosity of the glass flowing through all said body member openings to maintain a predetermined and constant flow of glass from said discharge opening.

3. A feeder for sheet glass or the like comprising a container for molten glass, a metallic body member forming at least a portion of an outer wall of said container, a plurality of individual openings formed in said body member and spaced apart laterally through the length thereof, said openings being below the level of the glass and extending inwardly and downwardly from the inner face of said body member and partially through said body member, a continuous rectangular discharge opening extending through the major portion of the length of said body member and inwardly from the outer face thereof, said discharge opening intersecting within said body member the lower ends of all of said individual openings, the center plane of said discharge opening coinciding with the diametrical plane of each said individual openings, means for regulating the static pressure head of molten glass over said openings, by changing the height of the glass over said openings, to thereby control the rate flow of glass to said laterally extending discharge opening, and means to control the viscosity of the glass flowing through all said openings.

4. A feeder in accordance with claim 3 in which said metallic body member is comprised essentially of a nickel-chromium alloy, said alloy being insoluble at temperatures within the range of the working temperatures of molten glass.

References Cited in the file of this patent

UNITED STATES PATENTS

| | | |
|---|---|---|
| Re. 21,863 | Slayter | July 22, 1941 |
| 770,832 | Taylor | Sept. 27, 1904 |
| 840,838 | George et al. | Jan. 8, 1907 |
| 1,954,732 | Gossler | Apr. 10, 1934 |